(12) United States Patent
Dyer

(10) Patent No.: US 11,625,701 B2
(45) Date of Patent: Apr. 11, 2023

(54) FLUID DISPENSER INCLUDING A DATA TRANSFER DEVICE, AND SYSTEM INCORPORATING SAME

(71) Applicant: Hydro Systems Europe Ltd., Bracknell (GB)

(72) Inventor: Christopher James Dyer, Hook (GB)

(73) Assignee: HYDRO SYSTEMS EUROPE LTD., Hook (GB)

( * ) Notice: Subject to any disclaimer, the term of this patent is extended or adjusted under 35 U.S.C. 154(b) by 291 days.

(21) Appl. No.: 16/766,868

(22) PCT Filed: Dec. 3, 2018

(86) PCT No.: PCT/GB2018/053498
§ 371 (c)(1),
(2) Date: May 26, 2020

(87) PCT Pub. No.: WO2019/106393
PCT Pub. Date: Jun. 6, 2019

(65) Prior Publication Data
US 2020/0327520 A1    Oct. 15, 2020

(30) Foreign Application Priority Data
Dec. 1, 2017   (GB) ..................................... 1720075

(51) Int. Cl.
*G06Q 20/18*        (2012.01)
*G07F 9/00*         (2006.01)
(Continued)

(52) U.S. Cl.
CPC ......... *G06Q 20/18* (2013.01); *G06K 7/10297* (2013.01); *G06K 7/10366* (2013.01);
(Continued)

(58) Field of Classification Search
CPC .. G06Q 20/18; G06K 7/10297; G07F 13/025; G08C 17/02; H04L 67/02; G01F 13/008
See application file for complete search history.

(56) References Cited

U.S. PATENT DOCUMENTS 9,830,764 B1    11/2017  Murphy
2004/0053625 A1*  3/2004  Bye .................. H04M 1/72457
                                              455/457
(Continued)

FOREIGN PATENT DOCUMENTS

EP         2339304 A1    10/2018
JP       2006118947 A     5/2006
(Continued)

OTHER PUBLICATIONS

European Patent Office, International Search Report and Written Opinion in PCT Application No. PCT/GB2018/0503498, dated Mar. 6, 2019.

(Continued)

*Primary Examiner* — Vernal U Brown
(74) *Attorney, Agent, or Firm* — Fish & Richardson P.C.

(57) ABSTRACT

A system incorporating a fluid dispenser for dispensing chemicals includes at least one sensor for sensing fluid flow and a dispenser management unit. The dispenser management unit includes a processor and corresponding storage memory for storing firmware, at least one input for receiving sensor data from the or each sensor, a data transfer device comprising storage memory for storing the received sensor data, and a power source for powering at least the processor. The system further incorporates a portable terminal configured to receive data from the dispenser, and a remote server configured to receive the data from the portable terminal.

18 Claims, 18 Drawing Sheets

(51) Int. Cl.
*G06K 7/10* (2006.01)
*G07F 13/02* (2006.01)
*G08C 17/02* (2006.01)
*H04L 67/02* (2022.01)

(52) U.S. Cl.
CPC ............ *G07F 9/001* (2020.05); *G07F 13/025* (2013.01); *G08C 17/02* (2013.01); *H04L 67/02* (2013.01)

(56) References Cited

U.S. PATENT DOCUMENTS

| | | | | |
|---|---|---|---|---|
| 2010/0094581 | A1* | 4/2010 | Cagle | G08B 21/245 |
| | | | | 702/176 |
| 2011/0082595 | A1 | 4/2011 | Mehus et al. | |
| 2012/0218106 | A1* | 8/2012 | Zaima | G16H 40/63 |
| | | | | 340/540 |
| 2013/0204202 | A1 | 8/2013 | Trombly et al. | |
| 2014/0300447 | A1 | 10/2014 | Ha et al. | |
| 2017/0048325 | A1 | 2/2017 | Tincher | |
| 2017/0061726 | A1 | 3/2017 | Wegelin | |
| 2017/0134887 | A1* | 5/2017 | Wegelin | H04W 64/00 |
| 2017/0335503 | A1 | 11/2017 | Fisher et al. | |
| 2018/0029859 | A1* | 2/2018 | Hevia | B67D 1/1234 |

FOREIGN PATENT DOCUMENTS

| | | |
|---|---|---|
| KR | 20150090726 A | 8/2015 |
| WO | WO 2016158347 A1 | 10/2016 |
| WO | 2017188816 A1 | 11/2017 |

OTHER PUBLICATIONS

International Preliminary Report on Patentability in International Appln. No. PCT/GB2018/053498, dated Jun. 11, 2020, 14 pages.

* cited by examiner

| Column 1 | Column 2 | Column 3 | Column 4 | Column 5 |
|---|---|---|---|---|
| Designation | Designation (abbreviated) | Min/max | No. of characters | Description |
| Platform identifier | PI | 1 | 1 | A single character that distinguishes between platforms. NFC dispenser = '1' |
| Unique identifier | UI | xxxxx | TBD | Each unit to have its own specific identification number. 5 characters in hex should be sufficient |
| Unit setup identifier | SI | As per 4.1.2 | TBD | Customer specific: Chemical + tip + flow rate |
| Total number of operations | Ops_noo_no | 0-99999 | 5 | Total number of operations |
| Total duration of operations | Ops_noo_ti | 0-999999 | 6 | Duration of total operations (seconds) |
| Total number of good operations | Ops_wnp_no | 0-99999 | 5 | Total number of good operations |
| Total duration of good operations | Ops_wnp_ti | 0-999999 | 6 | Duration of operations within normal parameters (seconds) |
| Maintenance required | Ops_mm | 0 = No<br>1 = Yes | 1 | Maintenance threshold reached (@ 999999 cycles). Also for low batt. |
| Year | Ops_yr | 17 | 2 | Year (2017 = 17) |
| Day number | Ops_dn | 019 | 3 | Day number of the year |
| Ch1 number of operations = Good<br>Ch2 number of operations = Good<br>Ch3 number of operations = Good<br>Ch4 number of operations = Good | Ops_wnp_ch1*<br>Ops_wnp_ch2<br>Ops_wnp_ch3<br>Ops_wnp_ch4 | *0 - 999<br><br>0-99 | *3<br><br>2 | Number of operations per chemical within normal parameters |
| Ch1 duration of operation = Good<br>Ch2 duration of operation = Good<br>Ch3 duration of operation = Good<br>Ch4 duration of operation = Good | Ops_wnp_ti_ch1<br>Ops_wnp_ti_ch2<br>Ops_wnp_ti_ch3<br>Ops_wnp_ti_ch4 | 0 - 9999 | 4 | Duration of total operations per chemical (seconds) within normal parameters |
| Ch1 number of operations = Bad<br>Ch2 number of operations = Bad<br>Ch3 number of operations = Bad<br>Ch4 number of operations = Bad | Ops_onp_ch1*<br>Ops_onp_ch2<br>Ops_onp_ch3<br>Ops_onp_ch4 | *0 - 999<br><br>0-99 | *3<br><br>2 | Number of operations per chemical outside of normal parameters |
| Ch1 duration of operation = Bad<br>Ch2 duration of operation = Bad<br>Ch3 duration of operation = Bad<br>Ch4 duration of operation = Bad | Ops_onp_ti_ch1<br>Ops_onp_ti_ch2<br>Ops_onp_ti_ch3<br>Ops_onp_ti_ch4 | 0 - 9999 | 4 | Duration of total operations per chemical (seconds) outside of normal parameters |

Key:
oops=operations, wpn=within normal parameters, onp=outside normal parameters, ti=time, no=number, ch=chemical, dn=day number, yr=year, mm=maintenance mode
*Chemical 1 to include one extra character as usage may be higher when configured as a single product unit

FIG. 7

| #1 | Unique identifier | Total number of operations | Total duration of operations | Total number of good operations | Total duration of good operations | Maintenance mode (0-No, 1-Yes) | Total characters |
|---|---|---|---|---|---|---|---|
| | 999999 | 99999 | 999999 | 99999 | 999999 | 1 | 29 |

FIG. 8

| Type - description | No. of dispensable chemicals | Code (example only) |
|---|---|---|
| LF - low flow | 1 | LF |
| HF - high flow | 1 | HF |
| QDV 4L - 4 low flow | 4 | 4L |
| QDV 3L+1H - 3 low flow, 1 high flow | 4 | 3L |
| QDV 2H+2L - 2 low flow, 2 high flow | 4 | 2H |
| QDV 4H - 4 high flow | 4 | 4H |

FIG. 10

| Chemical | Tip size | Flow rate ml/sec (hidden) |
|---|---|---|
| Chemical A | | |
| Chemical B | | |
| Chemical C | | |
| | Lt. Orange-006 | 0.09 |
| | Pink-010 | 0.15 |
| | Yellow-020 | 0.352 |
| | Grey-128 | 0.987 |
| Chemical D | | |

FIG. 11

FLUID DISPENSER INCLUDING A DATA TRANSFER DEVICE, AND SYSTEM INCORPORATING SAME

The present invention relates to a fluid dispenser having a data transfer device that includes a memory for storing operational data, a system having a portable terminal for communicating with fluid dispenser data transfer devices and a remote server, and a method of use of said system.

Fluid dispensers are used to dispense chemicals for applications such as cleaning, and laundry machines. The fluid dispensers may be operated by the user pumping the chemical into the required container, or by the user initiating an operation and mains water being allowed to flow through a venturi to draw chemical into the water flow. Such venturi fluid dispensers thus use the mains water to power and to dilute the chemical at the same time. To ensure correct dilution metering tips are used in the venturi to control the chemical fluid flow rate. The venturi-based fluid dispenser has a water inlet, a chemical inlet, and an outlet. The water inlet is coupled to a constriction portion of the venturi, leading to a throat, the outlet being coupled to a diffusion portion of the venturi, leading away from the throat. The chemical inlet is coupled to the venturi at the throat, such that upon water flow through the venturi a vacuum is caused at the throat which draws chemical into the water flow to be mixed with the water. The chemical and water mix flows out of the outlet. The dispenser is controlled by a user pressing a button to allow water to flow through the venturi. Other types of dispenser, for example those activated by the placement of a container against an activation lever positioned adjacent to a fluid outlet, are also known.

In each case, the fluid dispensers are simple, having no electronics, and no mains power source. The fluid dispensers are thus open loop, and have no means to determine how much chemical has been dispensed, or even whether chemical was dispensed at all.

These types of fluid dispenser are particularly useful for delivering chemicals into spray bottles, buckets or sinks for cleaning. In addition, such fluid dispensers may be used for spraying or foaming units for cleaning vehicles, factories and toilet facilities.

Complex, and relatively expensive, fluid dispensers are also known that are provided with high-powered wireless communications modules, such as Wi-Fi communications modules. The Wi-Fi communications modules require a mains electricity supply. Such fluid dispensers are therefore designed for locations where mains electricity is available, and for uses where cost is less of an issue, such as for laundry machines. For example, US 2017/0048325 A1 describes one such system that enables two-way data communication between one or more laundry machines and a remote device over a wireless LAN.

As will now be appreciated, with the simple, low cost, fluid dispensers, there is a desire to enable them to be more efficiently used, and to enable operational data to be gathered, without requiring significant device cost or additional infrastructure.

It is thus an object of the present invention to provide a simple, low cost, fluid dispenser capable of monitoring operations and usage, and to enable a user to review the information.

According to a first aspect of the present disclosure, there is provided a fluid dispenser for dispensing chemicals, comprising: at least one sensor for sensing fluid flow; a dispenser management unit comprising: a processor, and corresponding storage memory for storing firmware; at least one input for receiving sensor data from the or each sensor; a data transfer device comprising storage memory for storing said received sensor data; and a power source for powering at least said processor. The power source may also power the or each sensor.

Advantageously, providing such a dispenser enables a simple, low cost, fluid chemical dispenser to be provided, which utilises one or more sensors to monitor the operation of the fluid dispenser, and enables the data to be downloaded to a portable terminal in a simple, low cost, manner. Utilising a data transfer device may both reduce the cost of the fluid dispenser and the power requirements. Indeed, advantageously, in certain embodiments of the invention, the data transfer device may be a passive device that receives power directly from the portable terminal upon pairing, which means that even if the power source provided on the fluid dispenser to power the processor and sensors runs out, the data can be downloaded. One example of a passive data transfer device is a Near-Field Communication (NFC) tag. As used herein, the term "NFC tag" refers to devices that include an NFC standard compliant device comprising a processor, storage memory, and an antenna.

The storage memory of the data transfer device may be configured to store a unique identifier number. Advantageously, configuring the storage memory to store a unique identifier number enables the specific fluid dispenser to be identified when the data transfer device pairs with a device having a compatible device reader. Thus, the data received from the fluid dispenser can be more easily associated with the correct fluid dispenser.

The storage memory for storing firmware or other program code may be configured to store a fluid dispenser type identifier. Advantageously, configuring the memory to store a fluid dispenser type identifier enables the type of fluid dispenser to be identified when the data transfer device of the fluid dispenser pairs with a device reader, such as an NFC compatible reader. Thus, the device with which the fluid dispenser pairs can more easily determine what data it may expect to receive.

The or each fluid flow sensor may be one or more of: a water flow sensor; and a chemical flow sensor. Where a water flow sensor is provided, on fluid dispensers of the type which uses mains water supply to draw and dilute the chemical, the sensor may be a flow switch. Preferably, the flow switch is configured to activate upon a predetermined minimum water flow rate. The minimum water flow rate is preferably a water flow rate which enables the chemical to be drawn accurately and consistently. The fluid dispenser may further comprise an in-line pressure regulator configured to regulate the water pressure and flow, upon the water flow rate being at least the minimum water flow rate. U.S. Pat. No. 8,813,789 describes one such suitable in-line pressure regulator.

Alternatively, instead of providing a chemical flow sensor, a chemical sensor configured to detect the presence of chemical may be provided. The chemical presence sensor is configured to be activated upon chemical being present in the vicinity of the sensor.

The fluid dispenser may further comprise at least one operation sensor for sensing user operations of the fluid dispenser. The or each operation sensor may be one or more of: a fluid dispenser button activation sensor; and a chemical selector sensor. The or each sensor may be a magnetic switch, preferably a reed switch, more preferably a normally open reed switch.

As described above, the fluid dispensers of the present disclosure may be simple hand-pump type dispensers where a button activation sensor and a chemical flow sensor is required. Alternatively, the fluid dispenser may be a venturi-based dispenser where a button activation sensor, a water flow sensor, and a chemical flow sensor is required. Where a venturi-based dispenser is provided, the dispenser may have a chemical selector switch to enable one of a plurality of chemicals to be selected. In this case, the dispenser preferably has a chemical selector sensor.

The fluid dispenser processor, in dependence on said received sensor data, is preferably configured to determine at least one of: the number of correct operations per day; the duration of correct operations per day; the number of incorrect operations per day; the duration of incorrect operations per day; the total number of operations; and the daily number of operations.

The fluid dispenser processor is preferably configured to determine an incorrect operation by comparing the time difference between receipt of a button activation signal and the receipt of the water flow sensor signal, and comparing said time difference to a threshold. An incorrect operation may be determined upon the time difference being less than a predetermined threshold time. The predetermined threshold time may be between about 30 ms and about 50 ms, and in one embodiment about 40 ms.

In addition, or alternatively, an incorrect operation may be determined upon the time difference being greater than a predetermined threshold time. The predetermined time threshold may be between about 500 ms and about 2000 ms.

The fluid dispenser processor may be configured to determine the above parameters by comparing at least one received sensor data to at least one threshold. A correct operation may be determined by comparing the length of time an activation button is pressed to a threshold time, a correct operation being when the activation time is greater than the threshold time. Preferably, the threshold is between about 1 second and about 5 seconds, and in one embodiment about 2 seconds. Alternatively, or in addition, a correct operation may be determined by comparing the length of time an activation button is pressed to a threshold time, a correct operation being when the activation time is less than the threshold time. Preferably, the threshold is between about 60 seconds and about 100 seconds, and in one embodiment about 80 seconds.

Alternatively, or in addition, the fluid dispenser processor is preferably configured to determine an incorrect operation by comparing the time difference between receipt of a button activation signal and the receipt of the chemical flow sensor signal, and comparing said time difference to a threshold. An incorrect operation may be determined upon the time difference being less than a predetermined threshold time. The predetermined threshold time may be between about 50 ms and about 200 ms, and in one embodiment about 100 ms.

In addition, or alternatively, an incorrect operation may be determined upon the time difference being greater than a predetermined threshold time. The predetermined time threshold may be between about 1000 ms and about 2000 ms.

Alternatively, or in addition, a correct operation is determined by comparing the sequence of sensor inputs to a predetermined required sequence of sensor inputs. The predetermined sequence may comprise: button activation sensor signal; water flow sensor signal; chemical flow sensor signal; button activation sensor signal stops. It may be determined that an incorrect operation has occurred if the signals are received in any other order.

Where the fluid dispenser comprises a water flow sensor, a correct operation may be determined by comparing the length of time the water flow sensor is activated to a threshold time, a correct operation being when the activation time is greater than the threshold time. Where the fluid dispenser comprises chemical flow sensor, a correct operation may be determined by comparing the length of time the chemical flow sensor is activated to a threshold time, a correct operation being when the activation time is greater than the threshold time. Where a water flow sensor and a chemical flow sensor are provided, a correct operation may be determined by comparing the activation time of the water flow sensor and the chemical flow sensor, a correct operation being when the difference between activation times of each sensor is between about 0% and about 20% of the total time.

The data transfer device storage memory is preferably configured to store the or each one of: the number of correct operations per day; the duration of correct operations per day; the number of incorrect operations per day; the duration of incorrect operations per day; the total number of operations; and the daily number of operations.

The processor may be configured to compare the total number of operations to a threshold value, and output to said data transfer device storage memory a maintenance mode indication upon said total number of operations being greater than said threshold.

The processor may be configured to compare the number of incorrect operations per day to a threshold value, and output to said data transfer device storage memory a maintenance mode indication upon said total number of operations being greater than said threshold. Alternatively, the processor may be configured to compare the number of incorrect operations in a preset time period to a threshold value, and output to said data transfer device storage memory a maintenance mode indication upon said total number of operations being greater than said threshold. The preset time period may be one day, 5 days, 7 days, or 30 days.

When the processor is configured to compare the number of incorrect operations per day to a threshold value, the threshold value may be between 5 and 50, preferably between 10 and 40, and in one embodiment 30. In another example, the threshold may be calculated as a proportion of the total number of operations per day. The proportion may be between about 10% and about 50%, preferably between about 20% and about 40%.

The processor may be configured to determine the volume of chemical dispensed in each operation in dependence on said received sensor data. The volume of chemical dispensed may be determined by comparing the chemical flow sensor activation time to a known flow rate for the type of fluid dispenser. The known flow rate may be for a metering tip used in the venturi-based dispenser. Advantageously, determining the volume of chemical dispensed in this manner reduces the need for expensive flow rate sensors.

The fluid dispenser preferably further comprises at least one indicator light, configured to indicate to a user at least one of: a correct fluid dispenser operation; an incorrect dispenser operation; and the fluid dispenser requiring maintenance. For example, a green light may indicate a correct operation, a red light may indicate an incorrect operation, and a flashing red light may indicate maintenance required. Advantageously, the indicator lights may be configured to be illuminated intermittently to reduce power consumption.

The power source may comprise at least one of: an electrochemical cell; a capacitor, inductor, or other electromagnetic energy storage device; and a photovoltaic cell or other energy harvesting device. By providing the fluid dispenser with a stand-alone power source, the fluid dispenser may be placed in any location within a facility, and does not need to be wired directly to a mains electricity supply.

According to a further aspect of the present disclosure, there is provided a system for monitoring fluid dispensers, comprising: at least one fluid dispenser as described herein; at least one portable terminal comprising a device reader, and a terminal communications module; and a remote server comprising a server communications module. The remote server is configured to communicate with said terminal via a communications link between said terminal communications module and said server communications module. The terminal further comprises storage memory for storing sensor data received from the or each fluid dispenser data transfer device, said terminal being configured to upload said received sensor data upon communicating with said remote server.

Advantageously, providing a portable terminal having a device reader capable of communicating with the data transfer device of the fluid dispenser enables a simple, low cost, system to be provided for obtaining operational data from a fluid dispenser. As will be appreciated, the fluid dispensers of the present invention are simple, low cost, low-powered devices, which ordinarily would not be capable of sensing operational data, let alone communicating that data to a remote device. Thus, the present invention allows simple fluid dispensers to provide data to a remote server, via a portable terminal, using low cost, low power, data transfer devices. Furthermore, the present invention removes the need for any additional infrastructure, such as a Wi-Fi network, and can operate in any location.

The system may further comprise a data transfer device mountable to equipment to be monitored, wherein the data transfer device comprises storage memory configured to store a unique identifier number. The data transfer device may be mountable using adhesive, or similar means. Such a data transfer device enables the location of equipment to be monitored. Upon pairing the data transfer device with the portable terminal, the user may input the location of the equipment, thus enabling any user to determine the location. The mountable data transfer device may have identical components to the data transfer device provided in the fluid dispenser. Preferably, the mountable data transfer device has reduced storage memory, and reduced processing power, as compared to the data transfer device provided in the fluid dispenser. Advantageously, this enables a reduced cost system to be provided.

In use, the portable terminal may store the received data until a communications link between the terminal and the remote server can be established. For example, this may be the case if the fluid dispenser is provided in an area where there is no cellular network, or Wi-Fi network.

Upon a first pairing of said portable terminal device reader and said data transfer device, said portable terminal may be configured receive at least one input from a user to associate said data transfer device with at least one of: a physical location; a chemical to be dispensed by said fluid dispenser; and a chemical dispenser tip type. In addition, upon pairing of said portable terminal device reader and said data transfer device, a real-time clock of said processor may be updated using the clock of said portable terminal.

The terminal may be configured to determine the volume of chemical dispensed in each operation in dependence on said received sensor data. The volume of chemical dispensed may be determined by comparing the chemical flow sensor activation time to a known flow rate for the type of fluid dispenser. The known flow rate may be for a metering tip used in the venturi-based dispenser, and is preferably stored in memory of the terminal, associated with the fluid dispenser unique identifier number. Advantageously, determining the volume of chemical dispensed in this manner reduces the need for expensive flow rate sensors.

The system preferably comprises a plurality of fluid dispensers as described herein. In particular, the system may comprise a plurality of different types of fluid dispenser as described herein. Advantageously, the present invention enables all of these fluid dispensers to be monitored without the need for additional infrastructure to be provided in a facility.

The remote server of the system may be further configured as a web server configured to enable said received sensor data to be accessed from remote terminals having a web-browser. The web server preferably requires authorised log-in details to access said received sensor data.

The terminal communications module is preferably configured to use a wireless communications protocol. For example, the terminal communications module may use one or more of: a W-Fi protocol; and a cellular communications protocol.

The portable terminal is preferably one of: a smartphone; a mobile telephone; a Personal Digital Assistant (PDA); and a tablet computer.

According to a further aspect of the present disclosure, there is provided a method of monitoring fluid dispensers, comprising: on a data transfer device mounted to a fluid dispenser: receiving sensor data from at least one sensor on said fluid dispenser; storing said sensor data; on a portable terminal having a device reader and a communications module: initiating a communications link between said device reader and said data transfer device; receiving said sensor data stored on said data transfer device; initiating a communications link between a remote server and said communications module; and uploading said received sensor data to said remote server.

Advantageously, providing a method of monitoring fluid dispensers having the step of using an intermediate device to receive the operational data obtained on the fluid dispenser, before uploading that data to a remote server for more widespread analysis, enables the user of simple, low cost, dispensers to be analysed, where previously this was not possible.

The method may further comprise: on a remote server having a server communications module: storing said uploaded received sensor data; and downloading said received sensor data to a remote terminal upon said terminal accessing a web server running on said remote server.

The method may further comprise: on said fluid dispenser: in dependence on said received sensor data, determining at least one parameter, including: the number of correct operations per day; the duration of correct operations per day; the number of incorrect operations per day; the duration of incorrect operations per day; the total number of operations; and the daily number of operations; and storing on said data transfer device said determined parameters. The method may further comprise: on said fluid dispenser: comparing the total number of operations to a threshold value, and storing on said data transfer device a maintenance mode indication upon said total number of operations being greater than said threshold. The method may further comprise the step of determining the volume of chemical dispensed in each operation in dependence on said received sensor data. The method may also further comprise the step of indicating to a user upon at least one of: a correct fluid dispenser operation; an incorrect dispenser operation; and the fluid dispenser requiring maintenance.

The method may yet further comprise the step of, upon a first pairing of said portable terminal device reader and said data transfer device, receiving at least one input from a user to associate said data transfer device with at least one of: a physical location; a chemical to be dispensed by said fluid dispenser; and a chemical dispenser tip type.

The web server preferably requires authorised log-in details to access said received sensor data. For example, the remote server may be configured to store data received from a plurality of facilities, each facility having a different authorised user. In this way, the remote server is configured to only provide each authorised user with the data relevant to the facility that they are authorised to see.

Where functional modules are referred to in apparatus embodiments for carrying out various steps of the described method(s) it will be understood that these modules may be implemented in hardware, in software, or a combination of the two. When implemented in hardware, the modules may be implemented as one or more hardware modules, such as one or more application specific integrated circuits. When implemented in software, the modules may be implemented as one or more computer programs that are executed on one or more processors.

Any feature in one aspect of the disclosure may be applied to other aspects of the invention, in any appropriate combination. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

The invention will be further described, by way of example only, with reference to the accompanying drawings in which:

FIG. 7 shows a table of operational data determined by the fluid dispenser shown in FIGS. 1 and 2;

FIG. 8 shows a representation of the data format stored in the fluid dispenser shown in FIG. 1;

FIG. 10 shows a table of the types of flow dispenser;

FIG. 11 shows a table of the types of chemical to be dispensed from the fluid dispenser shown in FIG. 2;

Figure 14:
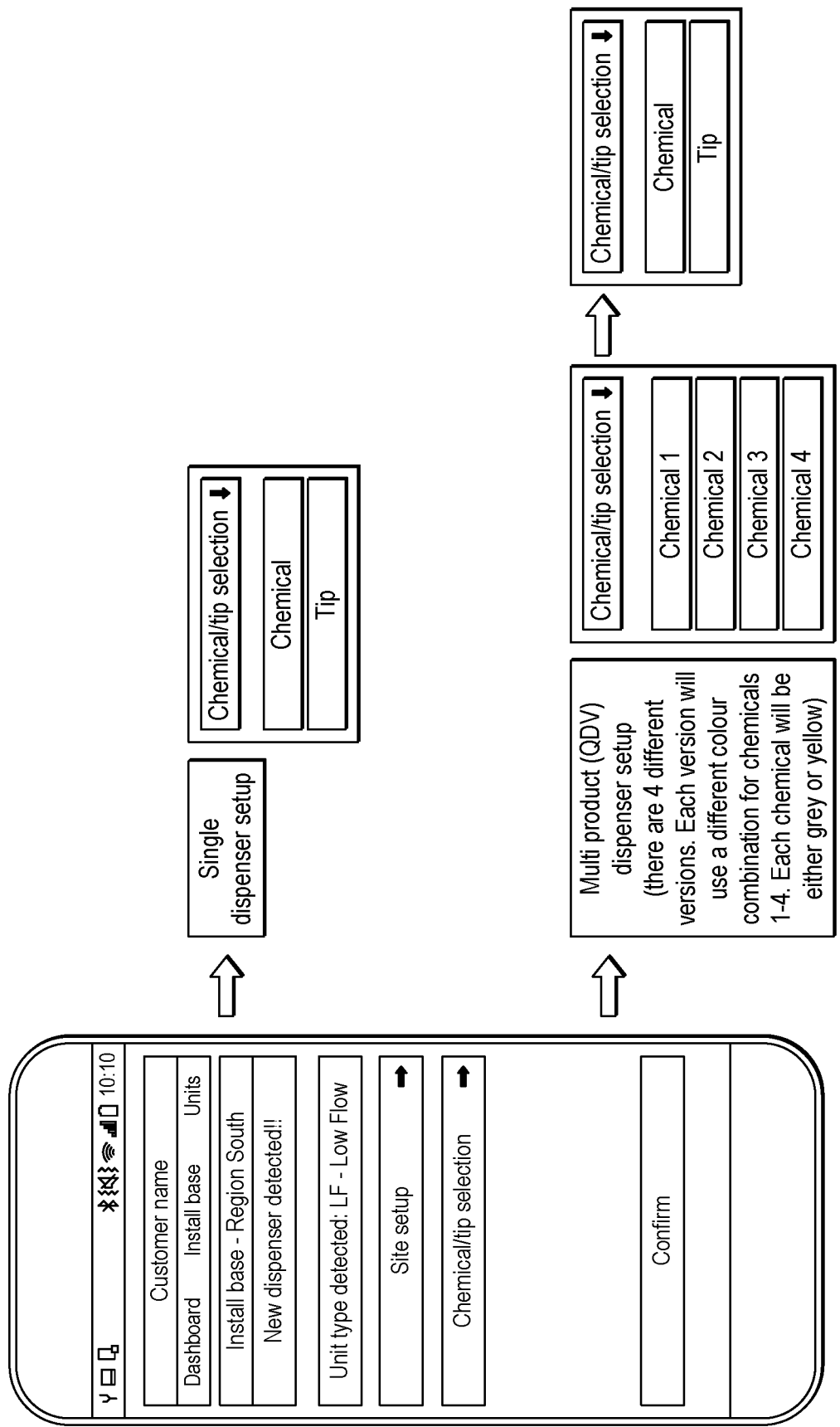
Figure 15:
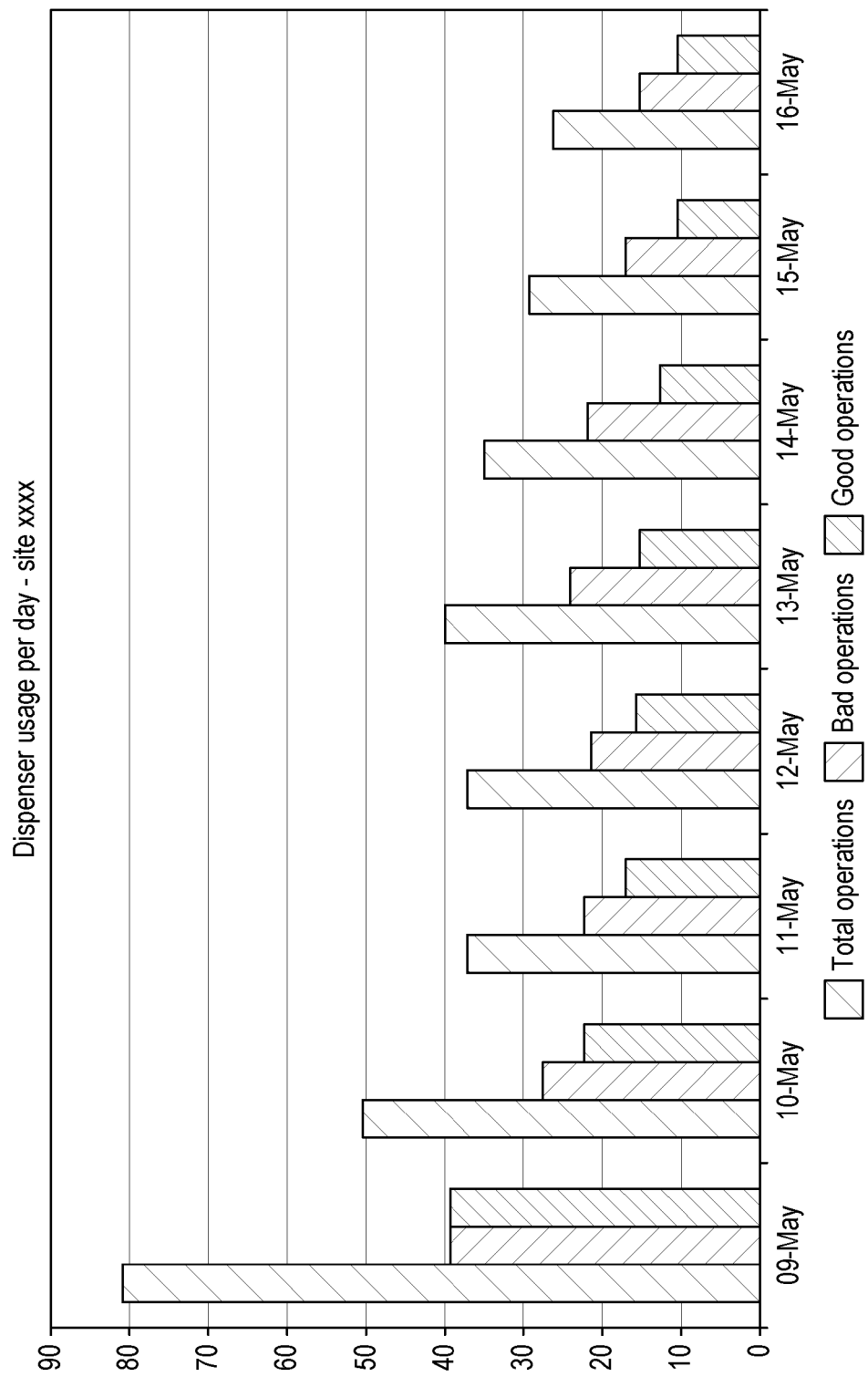
Figure 16:
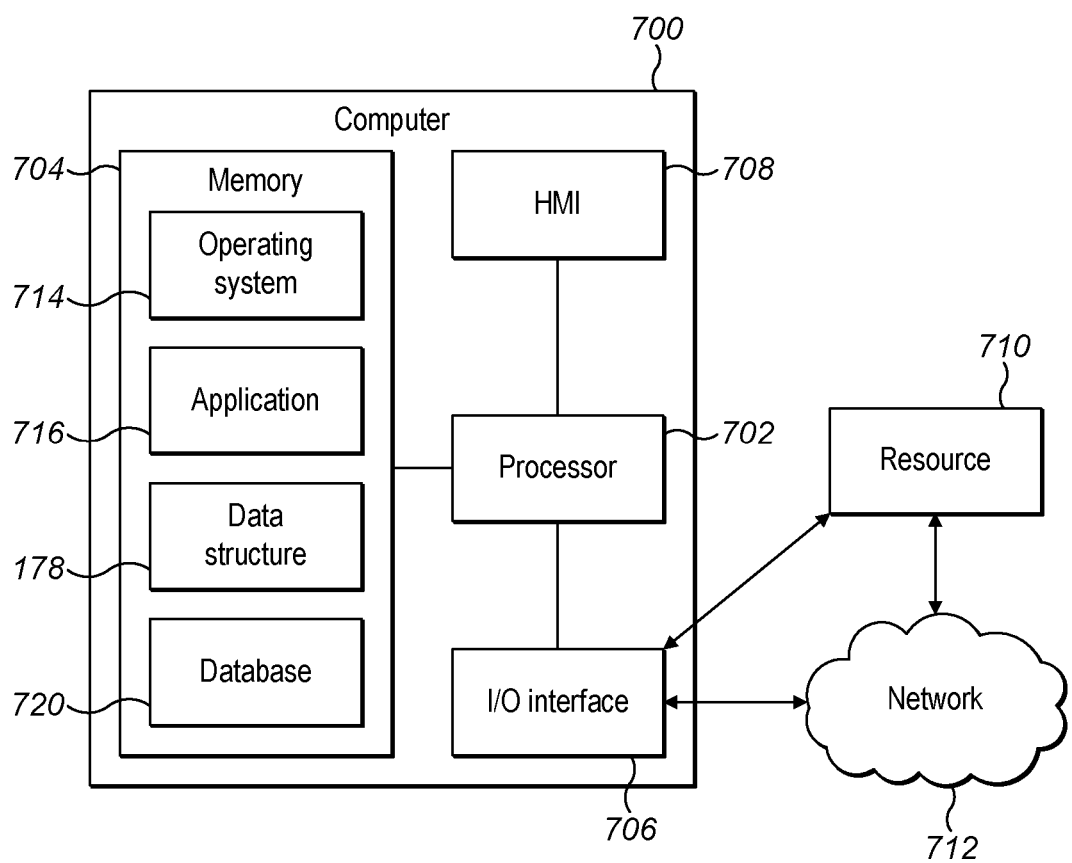

FIGS. 13a, 13b, 13c, and 13d show further examples of interfaces on a portable terminal for use in a system according to one embodiment of the present invention;

FIG. 14 shows an example of a fluid dispenser set-up interface on a portable terminal for use in a system according to one embodiment of the present invention;

FIG. 15 shows one example of a graph of operational data obtained by a fluid dispenser according to the present invention; and FIG. 16 shows a schematic representation of an exemplary computer which may be used to implement embodiments of the invention, or portions thereof.

The present disclosure relates to a fluid dispenser of the type that uses a manual button to activate a water flow valve, and that draws chemical to be dispensed using a venturi-based system. The fluid dispenser is provided with simple electronics and sensors for measuring operational parameters, and a data transfer device for both storing the operational parameters and then enabling a portable terminal to download the data. A system is provided to enable multiple such dispensers to be monitored, including one or more portable terminals, and a remote server. The operational data is stored on the remote server for later access by users either on the portable terminals, or from a web browser or the like. However it will be appreciated that any simple fluid dispenser may be provided with the sensors, processor, memory and the data transfer device, and so the invention is not limited to the specific dispensers described herein.

The data transfer device may include a memory and processing circuitry in communication with an electromagnetic transducer, such as an antenna comprising a coil or other conductive element, that allows the data transfer device to receive and transmit electromagnetic signals. The memory may store data that uniquely identifies the data transfer device, such as a Universally Unique Identifier (UUID). In response to receiving a suitable activation signal (e.g., a Radio Frequency (RF) signal transmitted by a device reader), the data transfer device may transmit a response signal encoded with all or a portion of the data stored in its memory, e.g., the UUID. A device reader proximate to the data transfer device may receive and decode the response signal to extract the data contained therein. The data transfer device may be powered by the activation signal (in the case of a passive device), or may be powered by a persistent power source such as a battery (in the case of an active device). Active data transfer devices may be able to communicate over a greater range than passive devices, and may be configured to periodically transmit a signal that includes at least a portion of the data stored in the memory autonomously, e.g., a beacon signal including the UUID. The data transfer device may be read-only (the data may be read but not changed), read/write (the data can be read and/or changed), or a combination in which a portion of the data is read only (e.g., the UUID), while another portion may be changed. Exemplary data transfer devices include Near-Field Communication (NFC) devices, Radio-Frequency Identification (RFID) devices, devices that transmit using one or more BLUETOOTH® standards that are managed by the Bluetooth Special Interest Group (SIG) of Kirkland Wash., United States, and the like.

Figure 1:
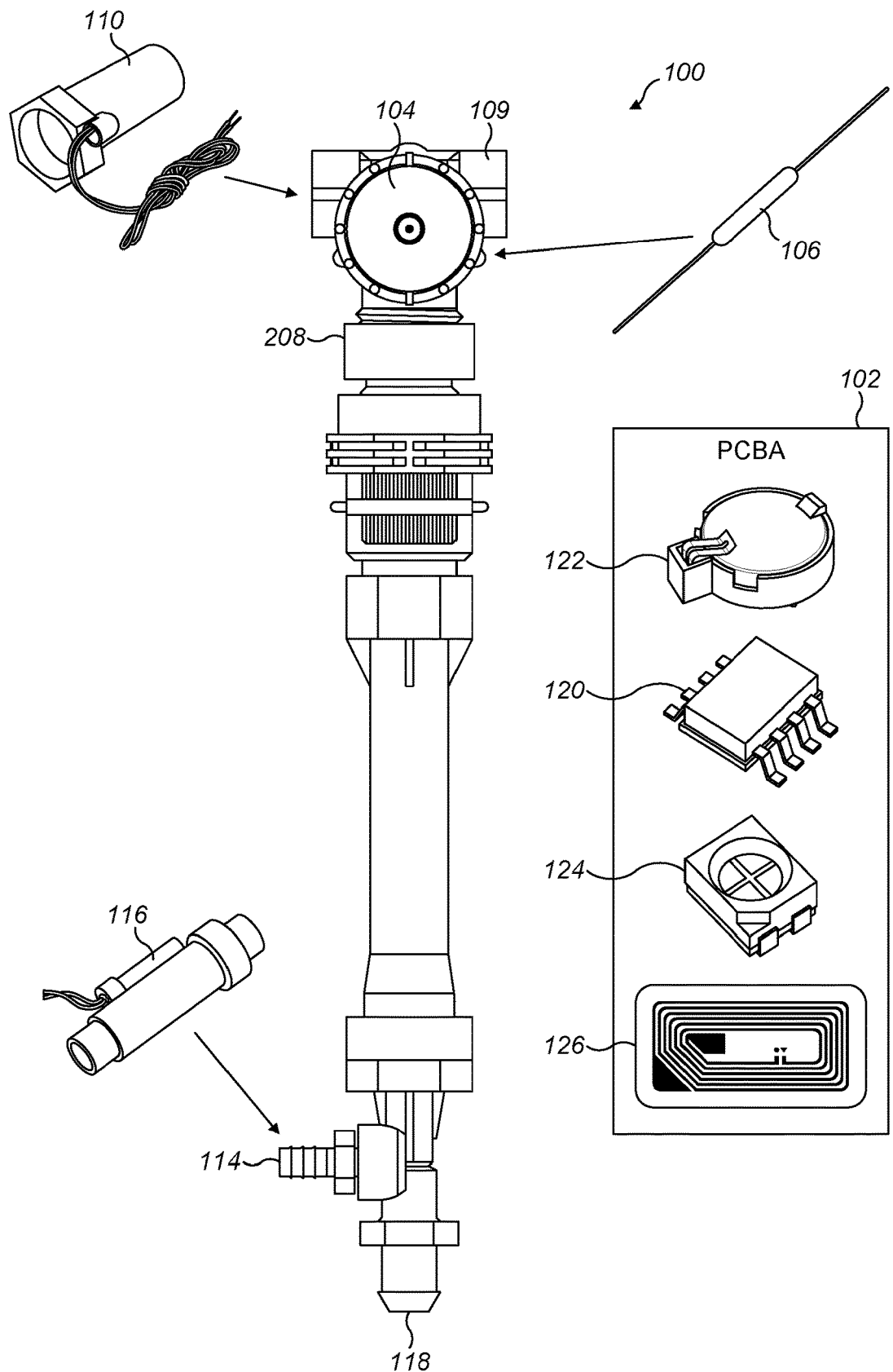
FIG. 1 shows one example of a fluid dispenser according to an embodiment of the present invention.

FIG. 1 shows one type of single chemical dispenser 100. The dispenser 100 is shown without its casing, where a printed circuit board assembly (PCBA) 102 would be mounted. The fluid dispenser 100 comprises an activation button 104 for initiating fluid dispensing. The water valve uses a doughnut shaped magnet that operates a diaphragm. The activation button 104 comprises a sensor in the form of a normally open reed switch 106. Upon fully depressing the button 104, the reed switch 106 is activated by the magnet provided in the button 104. A water flow rate control device 108 is provided downstream of the water inlet 109, to regulate the water flow rate such that the water flow rate through the device is not dependent on the inlet water pressure. A water flow sensor in the form of a switch 110 is provided upstream of the water valve, and upstream of a venturi 112. The water flow switch 110 is configured to activate, i.e. close, only upon a minimum water flow rate. Again, a normally open reed switch may be used for the water flow sensor. The venturi 112 has a chemical fluid inlet at the neck portion, and coupled to that inlet is a chemical flow metering tip 114, and chemical flow sensor in the form of a switch 116. A hall effect sensor may be used for the chemical flow sensor. The diluted chemical then flows through the outlet 118.

The PCBA 102, in the form of a dispenser management unit, mounted to the casing, is electrically coupled to the sensors 106, 110 and 116. The dispenser management unit 102 comprises a processor and associated memory 120, a power source 122 in the form of a small electrochemical battery, an indicator in the form of a RBG LED 124, and a data transfer device 126 having storage memory. The data transfer device, in addition to the storage memory comprises a processor and antenna. The storage memory may be sufficient to store approximately 150 days or so of operational parameters. The battery may be configured to provide sufficient energy to power the processor and sensors for about three years. As will be appreciated, the data transfer device may not require an on-board power source in embodiments where it is inductively powered by the device reader provided on the portable terminal. As described above, the battery is configured to operate the dispenser management unit for about three years. It is expected that in this time, approximately 22,000 dispensing operations will be carried out. As such, 22,000 is determined, in this example, as a maintenance threshold. Upon the total number of operations exceeding this threshold, the processor indicates to the user, via the LED 124 that maintenance is required.

Figure 2:
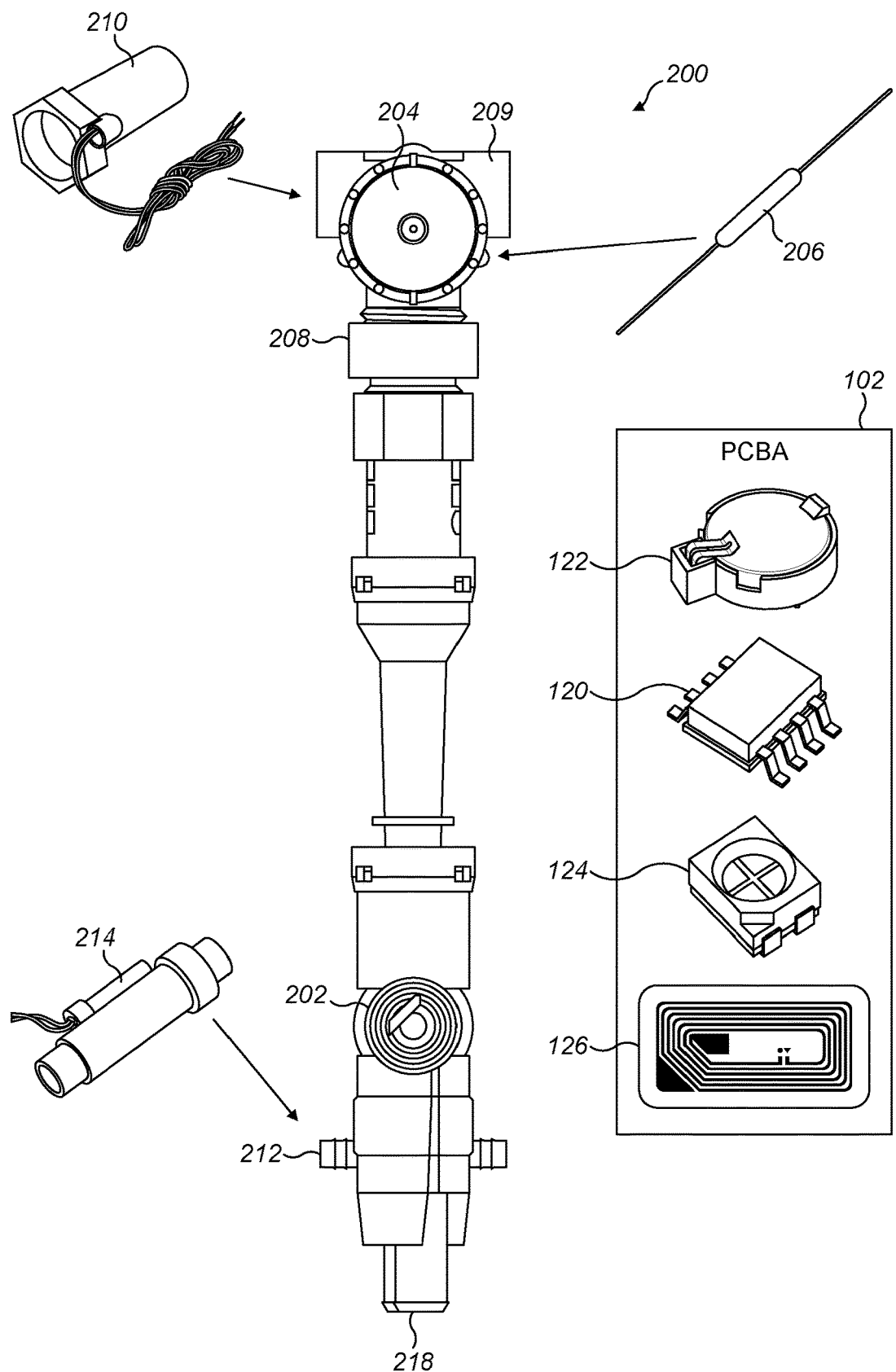
FIG. 2 shows a further example of a fluid dispenser according to an embodiment of the present invention.

FIG. 2 shows a further fluid dispenser 200 having a chemical selector switch 202. Again, a normally open reed switch may be used for a chemical selector sensor. In this example, the chemical selector switch 202 enables the user to select one of four different chemicals to be dispensed. The dispenser 200 is otherwise similar to dispenser 100, and so comprises an activation button 204 for initiating fluid dispensing. The water valve uses a doughnut shaped magnet that operates a diaphragm. The activation button 204 comprises a sensor in the form of a normally open reed switch 206. Upon fully depressing the button 204, the reed switch 206 is activated by the magnet provided in the button 204. A water flow rate control device 208 is provided downstream of the water inlet 209, to regulate the water flow rate such that the water flow rate through the device is not dependent on the inlet water pressure. A water flow sensor in the form of a switch 210 is provided upstream of the water valve, and upstream of a venturi (not shown) for each of the selectable chemicals to be dispensed; in this example four venturis are provided. The water flow switch 210 is configured to activate, i.e. close, only upon a minimum water flow rate. Each venturi has a chemical fluid inlet provided at the neck portion, and coupled to that inlet is a chemical flow metering tip 212, and chemical flow sensor in the form of a switch 214. The diluted chemical then flows through the outlet 218.

The dispenser management unit 102 of the dispenser 200 is the same as the dispenser management unit of dispenser 100. The firmware, which controls the processor and carries out the operations, may be the same for each dispenser to enable a reduction in costs.

As described in further detail below, in use, the fluid dispenser management unit 102 is configured to receive inputs from the plurality of sensors. Upon a user pressing the activation button the button sensor provides information to the processor 120, and the duration of the button press is measured. In addition, the processor receives sensor information from each of the water flow and chemical flow switches, and measures the duration of each. Where present, the chemical selector switch provides information to the processor in dependence on the chemical selected. The processor 120 determines various operational parameters in dependence on the received sensor data, and the operational parameters are stored in storage memory on the data transfer device 126.

Figure 3:
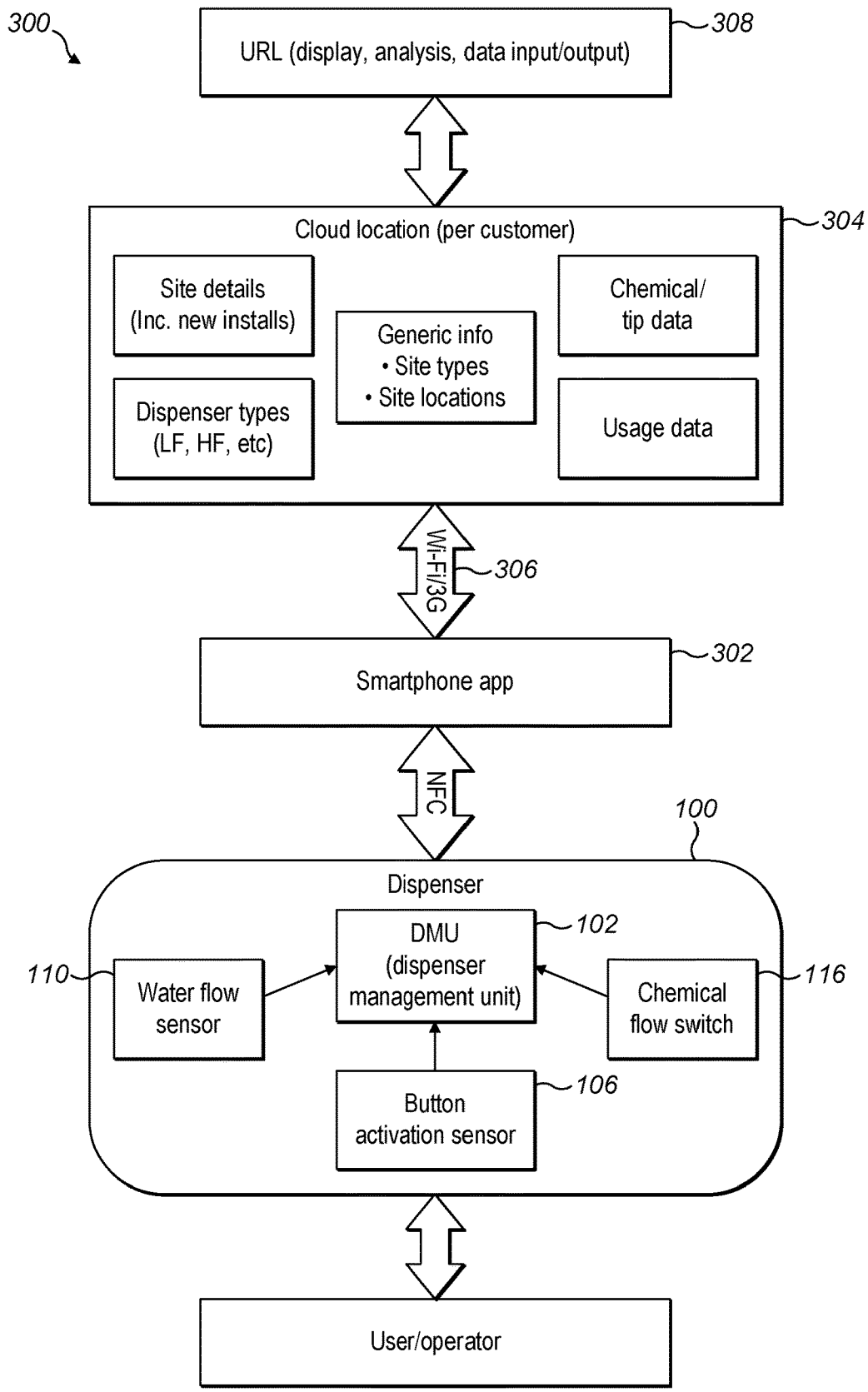
FIG. 3 shows a schematic representation of a fluid dispenser monitoring system according to an embodiment of the present invention.

A plurality of such fluid dispensers 100 and 200 form part of a system 300, shown in FIG. 3, for monitoring the usage of the dispensers. In addition to the plurality of dispensers, the system 300 comprises a portable terminal 302 in the form of a smartphone having an application (App) running thereon, and a remote server 304.

As described above, the dispenser management unit 102 is configured to store, on the data transfer device, the operational parameters determined in dependence on the sensor data. Upon a user presenting the portable terminal 302 to a dispenser, the operational parameter data is downloaded to the portable terminal from the data transfer device, e.g., using the NFC protocol. The portable terminal 302 may be configured to automatically start the App upon pairing with a data transfer device 126, or upon detecting a beacon signal transmitted by the data transfer device 126.

The portable terminal 302 is configured to enable a user to input additional data and information that corresponds to the specific fluid dispenser. To enable this additional data to be associated to the specific fluid dispenser, of which there may be a large number, each dispenser management unit is configured to store a unique identifier which is also uploaded to the portable terminal. In addition, each dispenser may be configured to store a dispenser type identifier to enable the portable terminal to determine which type, e.g. 100 or 200, of dispenser it is paired with.

Once the App is running on the portable terminal 302, and the data has been downloaded from the data transfer device, the user may, upon first pairing with the device, input set-up information such as which site the dispenser is located in, the location within the site, which metering tip is being used, and so on. This is described in further detail below.

The portable terminal may then immediately upload the received data, together with the user inputted information, to the remote server 304 over a communications link 306. The portable terminal comprises a communication module configured to communicate using a wireless protocol such as Wi-Fi or a cellular network protocol such as 3G, 4G or the like. Alternatively to immediately uploading the data, if no wireless communications link is available, e.g. when the dispenser is in a location, such as a basement, where no such wireless communications are available, the portable terminal may store the data locally until wireless communications are available. As will be appreciated, the portable terminal therefore acts as a bridge between the dispensers and the remote server.

The data stored on the remote server 304 may be accessed either by the portable terminal 302 or by a web browser 308. Only users authorised to access the data can log-in to the remote server via the web browser. The web server is configured to provide a user with: data specific to their sites; data relating to chemicals and tips; data relating to their chosen dispenser types; and usage data for each site-dispenser.

Figure 4:
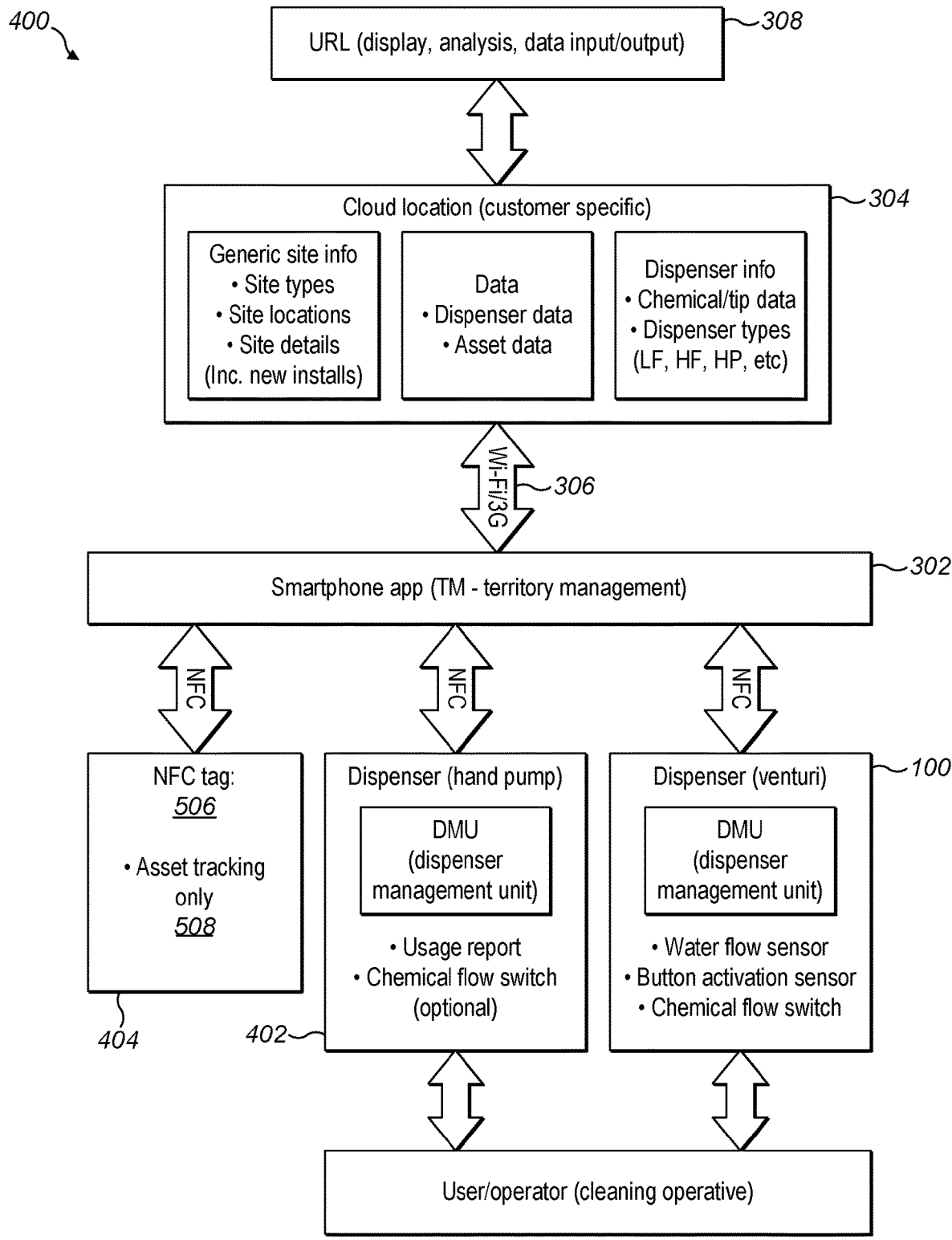
FIG. 4 shows a further schematic representation of a fluid dispenser monitoring system according to an embodiment of the present invention.

A further example of a system 400 is shown in FIG. 4, similar to that shown in FIG. 3. As can be seen, the system 400 further comprises an alternative type of fluid dispenser 402, and a mountable data transfer device 404. The fluid dispenser 402 is a less complex dispenser, being operated by a user operated pump to dispense a chemical, without water as a diluent. As such, dispenser 402 may comprise only a chemical flow sensor. The operational data obtained from dispenser 402 is also uploadable to the portable terminal 302. The mountable data transfer device 404 may be mounted to any equipment, using adhesive or the like. The data transfer device 404 is used to track equipment so that the location of that equipment can be known. No operational data is uploaded to the portable terminal, rather upon pairing with the portable terminal the data transfer device merely provides a unique identifier to enable the user to input the location of the equipment into the App running on the portable terminal.

Figure 5:
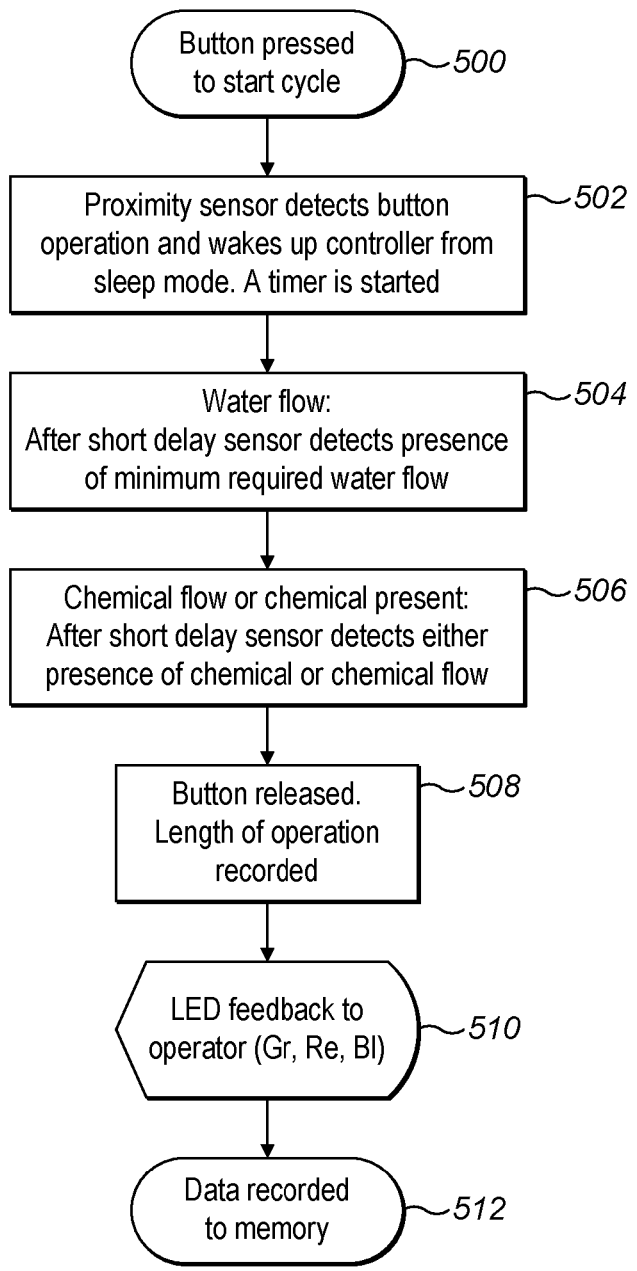
FIG. 5 shows a flow chart of a method of monitoring usage of a fluid dispenser shown in FIG. 1.

The operation of the fluid dispenser 100 is now described in further detail with reference to FIG. 5. As can be seen, upon a user pressing the activation button, at step 500, the dispenser management unit is initiated. At step 502, the button activation sensor wakes up the processor 120 from sleep mode, and a timer is started. At step 504, after a short delay of about 1.0 seconds, to enable the water flow rate to be sufficient, the water flow sensor is activated. At step 506, after a short further delay, the chemical begins to be drawn into the venturi by the water flow, and the chemical flow sensor is activated. At step 508, the activation button is released, and the duration of the operation is determined and stored. At step 510, the LED indicator 124 provides feedback to the user as to whether the operation was successful. Finally, at step 512, the sensor data is used to determine various operational parameters, and then stored in the data transfer device memory.

Figure 6:
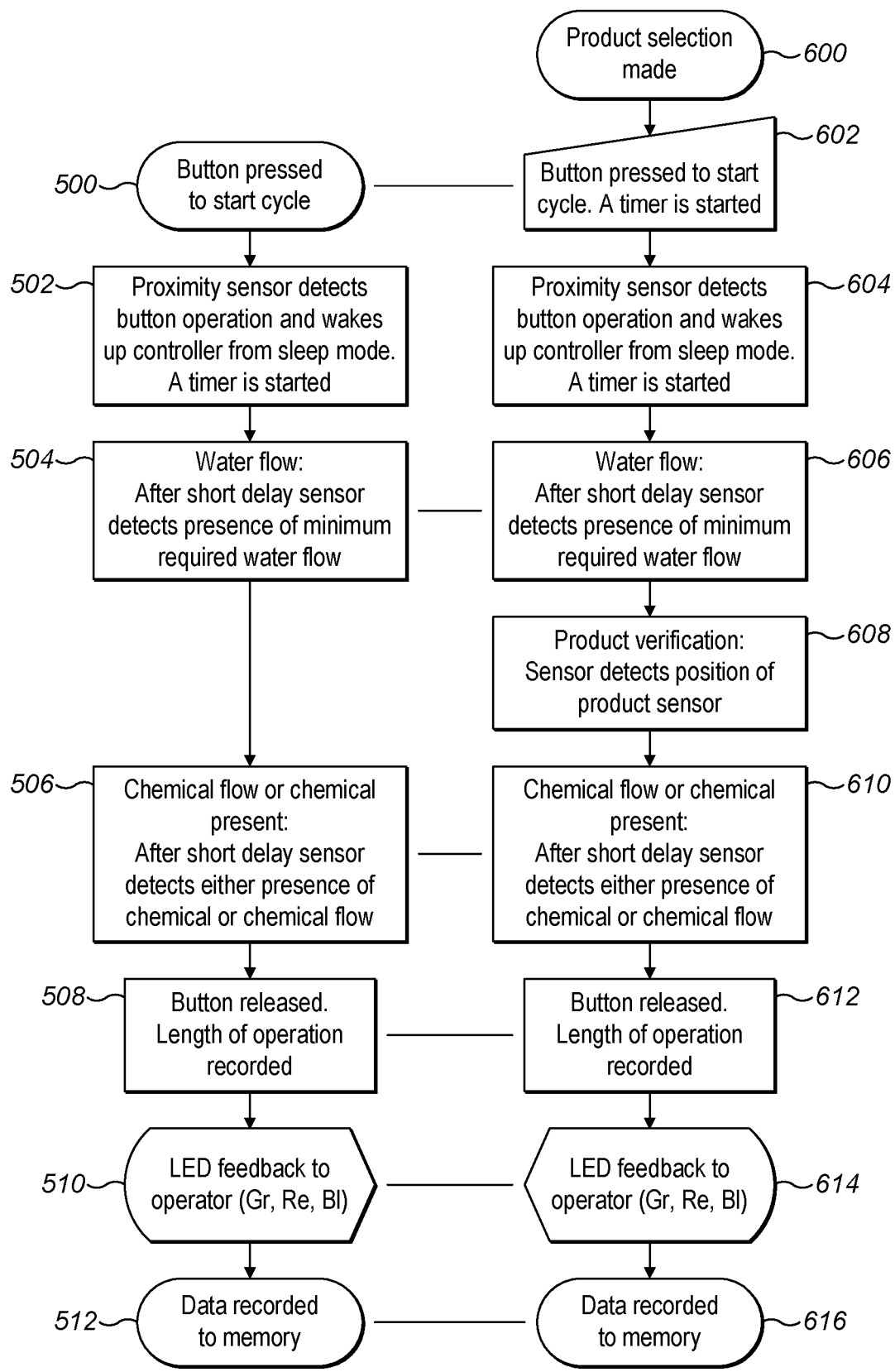
FIG. 6 shows a flow chart of a method of monitoring usage of a fluid dispenser shown in FIG. 2.

The operation of the fluid dispenser 200 is now described in further detail with reference to FIG. 6. As can be seen, the operation is similar to that of fluid dispenser 100. The user, at step 600, selects the chemical product to be dispensed. Upon the user pressing the activation button, at step 602, the dispenser management unit is initiated. At step 604, the button activation sensor wakes up the processor 120 from sleep mode, and a timer is started. At step 606, after a short delay of about 1.5 seconds, to enable the water flow rate to be sufficient, the water flow sensor is activated. At step 608, the chemical selector sensor is interrogated to determine, and verify, the chemical being dispensed. At step 610, after a short further delay, the chemical begins to be drawn into the venturi by the water flow, and the chemical flow sensor is activated. At step 612, the activation button is released, and the duration of the operation is determined and stored. At step 614, the LED indicator 124 provides feedback to the user as to whether the operation was successful. Finally, at step 616, the sensor data is used to determine various operational parameters, and then stored in the data transfer device memory.

As discussed above, various operational parameters are determined by the processor 120 in dependence on the received sensor data. FIG. 7 shows a table of that operational data, as well as the unique identifiers used. The operational parameters determined are: the total number of operations, the total duration of operations, the total number of good/correct operations, the total duration of good/correct operations, and whether maintenance is required. For dispenser 200 having up to four different chemicals to select, the above operational parameters are determined for each of the chemicals. Therefore, four channels of data are determined.

A good/correct operation is determined as an operation having a duration between about 2 and about 80 seconds. In addition, a good operation has a successful cycle, starting with a button activation, water flow, chemical flow, and a button release. Any operation that does not comply with these parameters would be considered an unsuccessful, bad/incorrect, operation.

An example of a correct cycle of sensor signals received at the processor is provided below:
a. Button is pressed to start cycle, signal received at processor on Channel 3
b. Water flow switch (Channel 2):
   This channel should be activated immediately after the button is pressed (10 ms-15 ms maximum) in order to sense the flow switch when it is activated at around 40 ms after button is pressed (minimum duration recorded).
   When the channel becomes active it should not immediately see a signal as this could mean that the flow switch was stuck in the open flow position. Therefore, the time difference between receipt of the button activation signal on Channel 3 is compared to the time of receipt of the water flow switch signal on Channel 2. If the time difference is less than 40 ms, an error has occurred and an incorrect operation is recorded.
   Once active, the signal on Channel 2 should remain so until the button is released or a time in seconds has elapsed.
c. Chemical flow switch (Channel 1)
   Should be activated after the water flow switch.
   Typical timescales in testing show the switch to become activated are 325 ms, 440 ms, 511 ms, 535 ms, 967 ms.
   The channel 1 input is to become active as soon as the button is pressed. If a signal is present from the start then this would show that the switch was jammed on, or that chemical has been depleted (thick chemical, previous dispense).
   Once the signal has been received it should remain active until:
   i. The button has been released.
   ii. The end of any active monitoring of the signal ends.
d. Button is released to end the cycle.

An alternative example of a correct cycle, where a chemical presence switch is provided instead of a chemical flow switch is provided below:
a. Button is pressed to start cycle, signal received at processor on Channel 3
b. Water flow switch (Ch2)
   As per above example
c. Chemical flow switch (Ch1)
   The channel input is to become active as soon as the button is pressed. A signal should be read immediately to show that chemical is present. If the signal is lost at any time during the dispense then this would show that the switch was jammed off, or that chemical has been depleted.
   Once the signal has been recorded it should remain active until:
   i. The button has been released ii. The end of any active monitoring of the signal ends.

d. Button is released to end the cycle.

Figure 9:
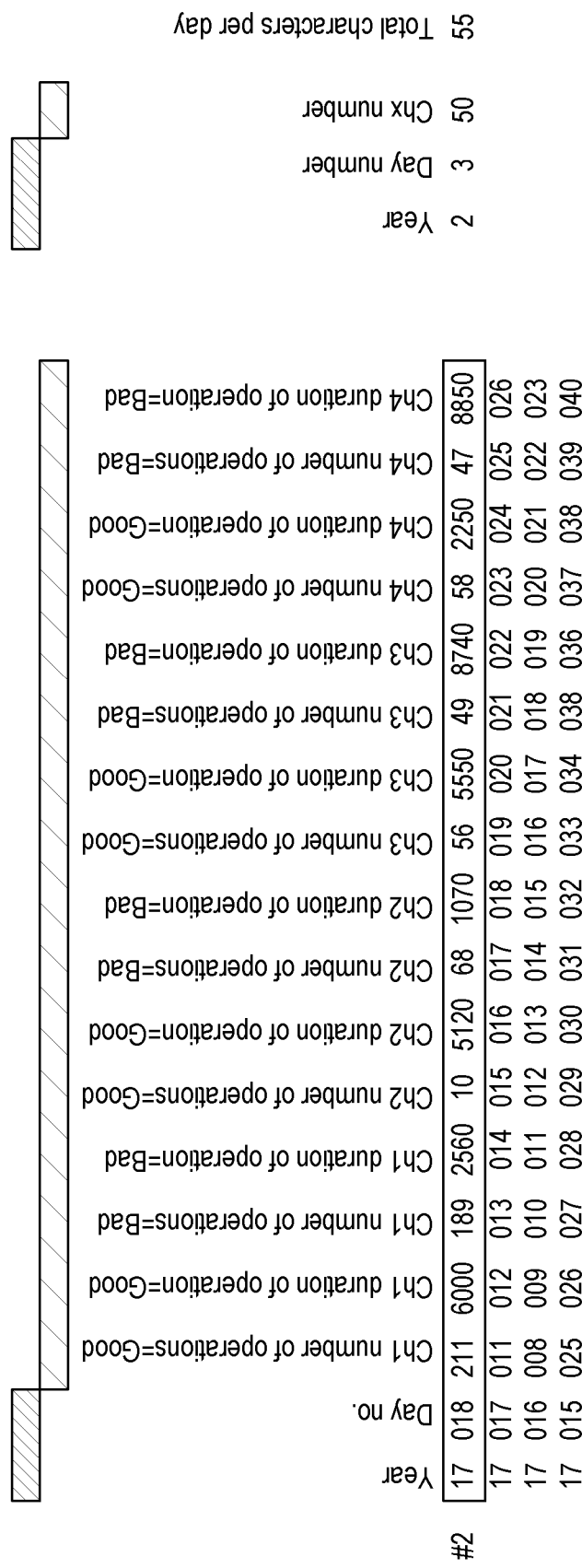
FIG. 9 shows a representation of the data format stored in the fluid dispenser shown in FIG. 2.

FIGS. 8 and 9 show the data format stored on the data transfer device 126. As will be appreciated, the storage on the data transfer device 126 may be limited, and so the data format is selected to minimise data usage. As can be seen, the latest data entry is for the current day's usage which means that when the storage memory becomes full, the oldest data is over-written first.

As described above, each type of dispenser is provided with a unique dispenser type identifier. FIG. 10 shows examples of such types of dispenser, and the unique identifier associated with each type of dispenser.

Again as described above, each type of chemical available to be dispensed from dispenser 200, may also have a specific metering tip. The metering tip is used to determine the volume of chemical dispensed, and so FIG. 11 shows the various metering tips that can be selected, from within the App running on the portable terminal, to be associated with a chemical to be dispensed from that dispenser.

Figure 12:
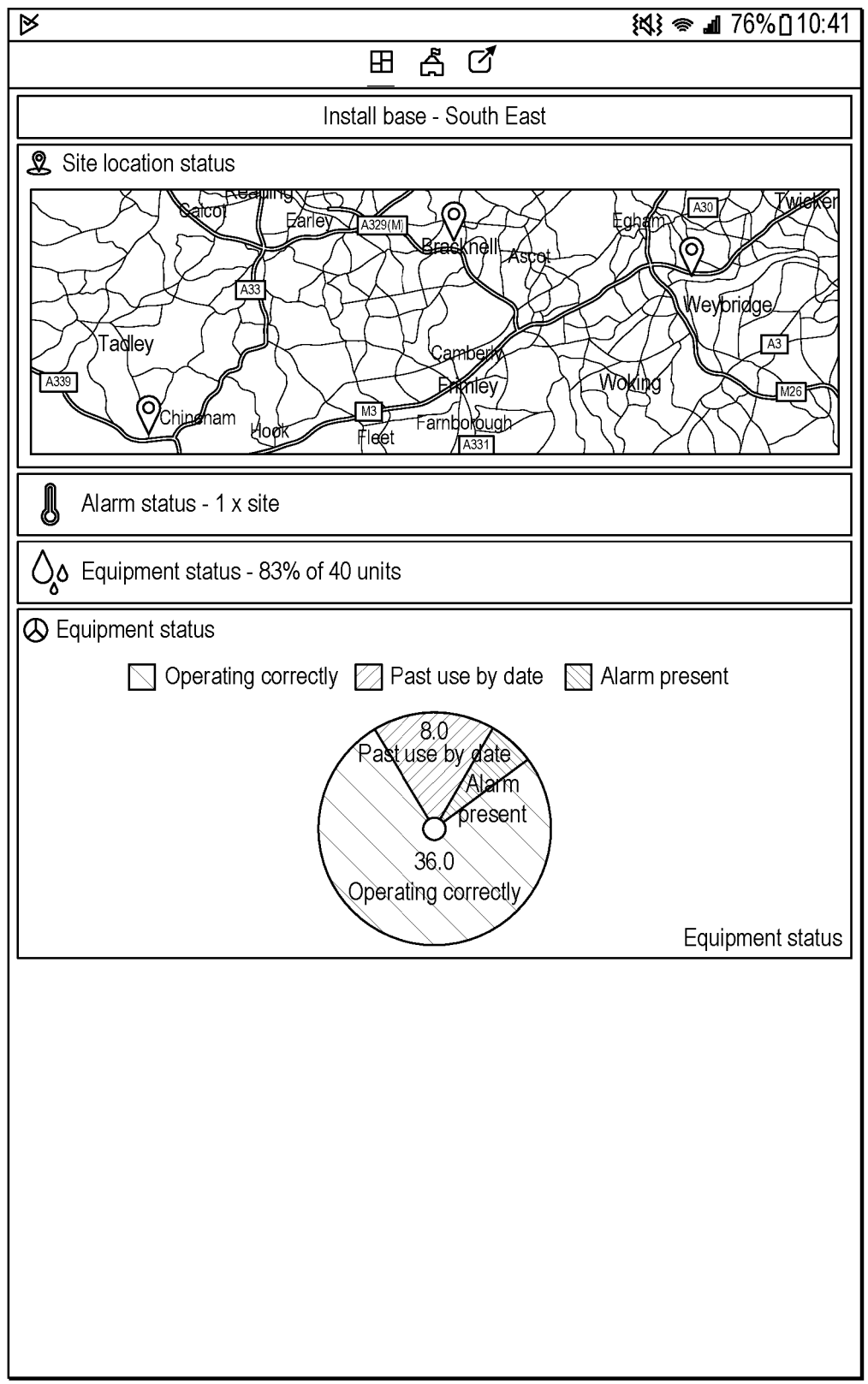
FIG. 12 shows an example of an interface on a portable terminal for use in a system according to one embodiment of the present invention.
Figure 13A:
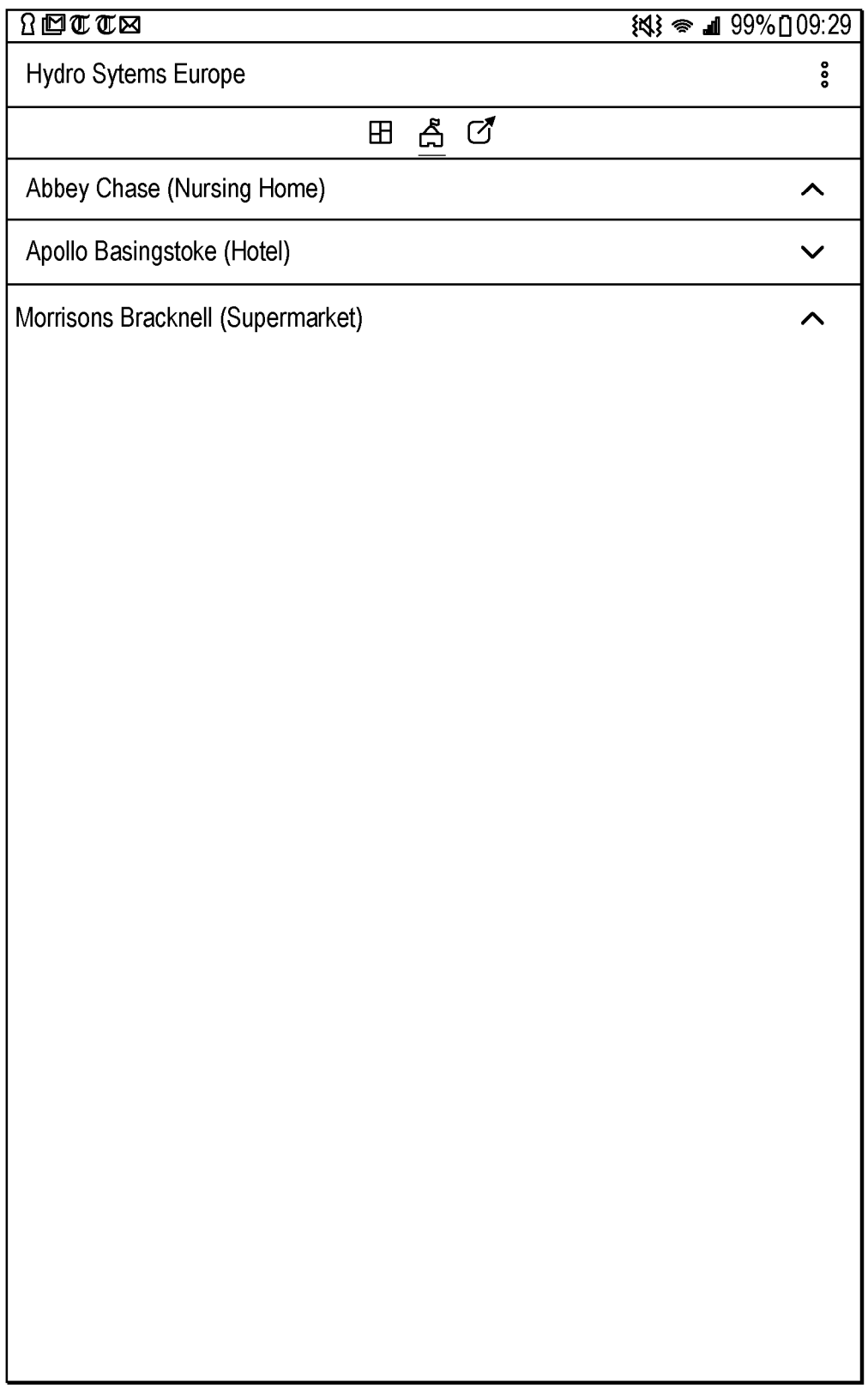
Figure 13B:
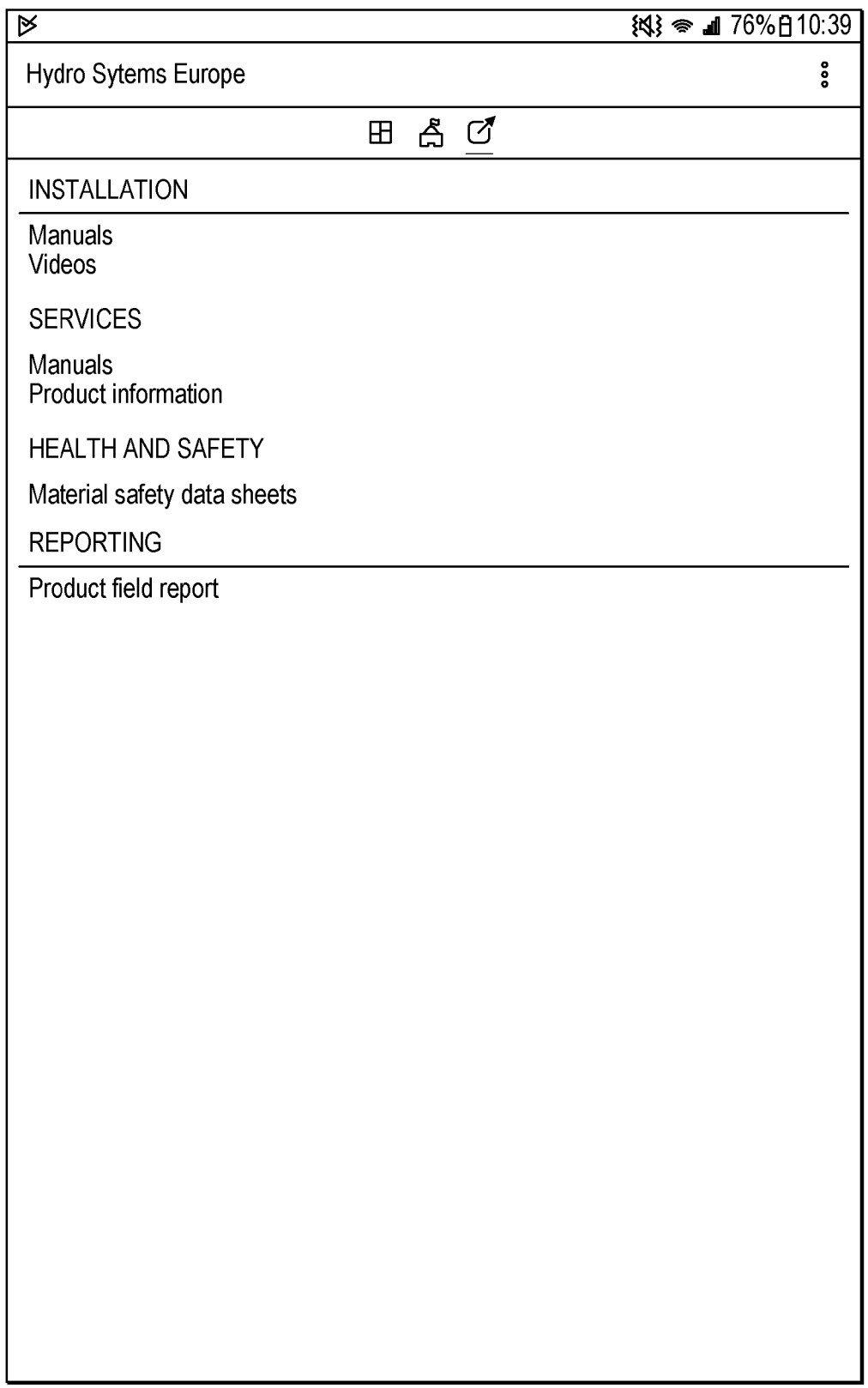
Figure 13C:
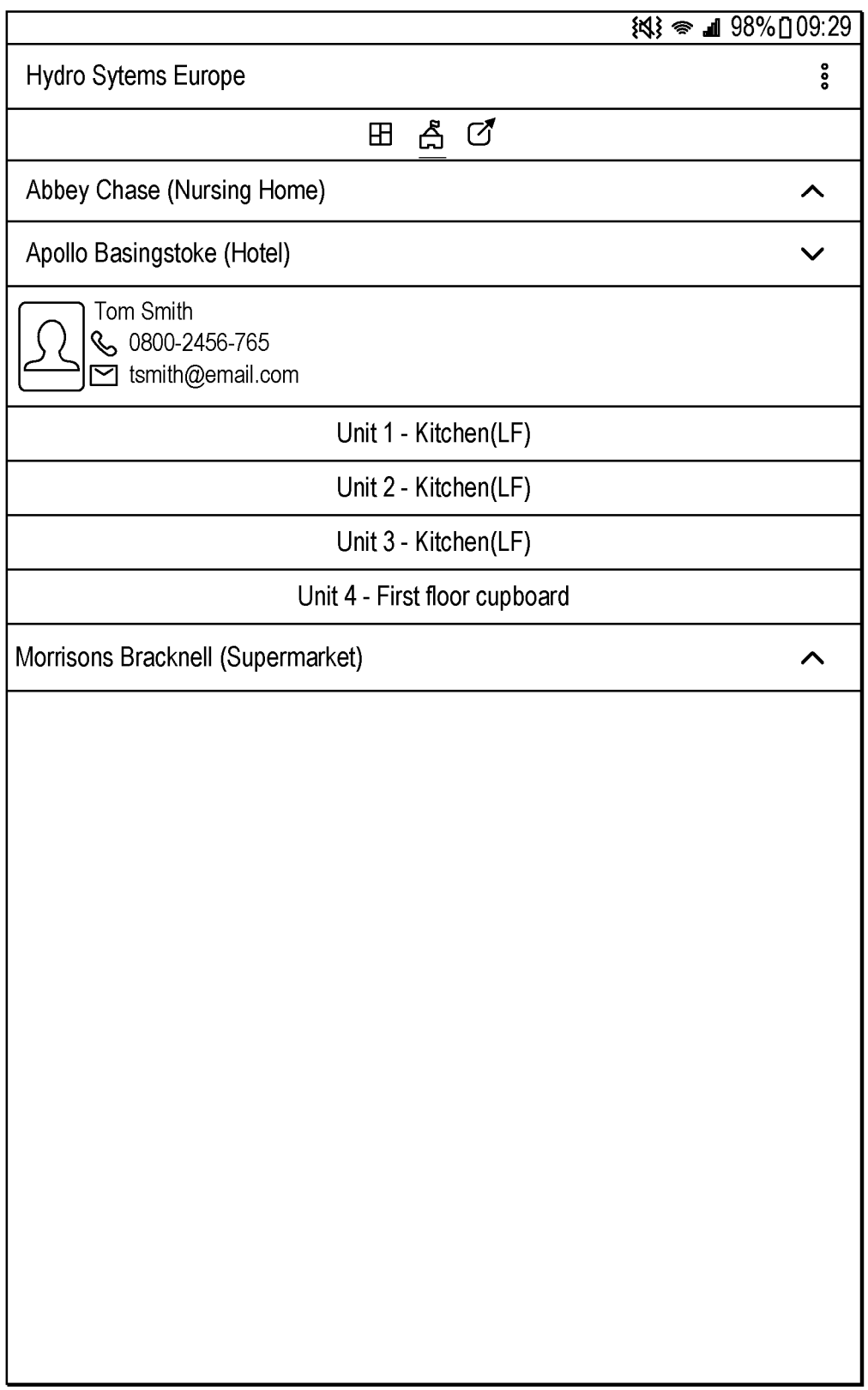
Figure 13D:
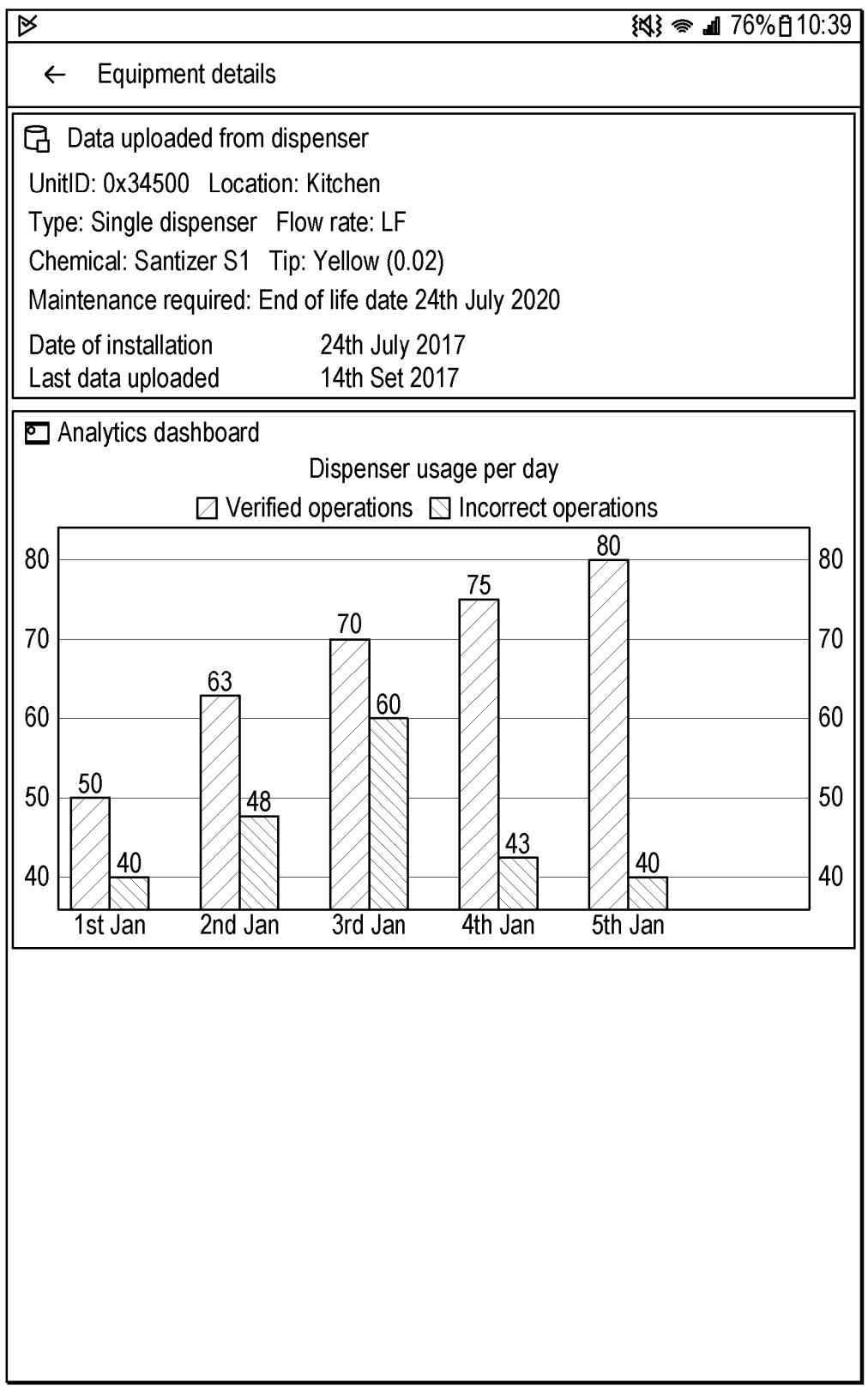

Moving now to the App running on the portable terminal, as shown in FIGS. 12 to 14, various user interface screens are provided. FIG. 12 shows a dashboard for a specific user, detailing the number of sites, and the number and type of dispensers that the user is responsible for. FIGS. 13(a) to 13(d) show various interface levels as the user first selects the site which they wish to review, FIG. 13(a), the relevant documentation for the site, FIG. 13(b), the dispensers available at that site, FIG. 13(c), and then a specific dispenser, FIG. 13(d).

FIG. 14 shows the interface provided by the App to enable an initial set-up of a new dispenser. Upon first pairing with a new dispenser management unit 102, the real-time clock is first updated on the dispenser management unit 102, using the clock on the portable terminal. This may be done each time the portable terminal subsequently pairs with the dispenser management unit so that the time and date of the operations are accurate. The dispenser management unit then transfers the unique identifier code and the dispenser type code to the portable terminal. This information enables the App to show either the single dispenser 100 type set-up information, or the multiple dispenser 200 type set-up information. In each case, the user may then input various information including the chemical being dispensed, and the metering tip being used for the or each chemical being dispensed. In addition, the user inputs the location of the physical site and location of the dispenser within that site.

FIG. 15 shows a graph of information that has been received from the dispenser. In this example, the dispenser usage per day is displayed and broken down into total, good/correct and bad/incorrect operations. As will be appreciated, the user can interrogate the data in any way they require.

Referring now to FIG. 16, embodiments of the invention described above, or portions thereof, may be implemented using one or more computing devices or systems, such as exemplary computer 700. The computer 700 may include a processor 702, a memory 704, an input/output (I/O) interface 706, and a Human Machine Interface (HMI) 708. The computer 700 may also be in communication with one or more external resources 710 via the network 712 and/or I/O interface 706. External resources may include, but are not limited to, servers, databases, mass storage devices, peripheral devices, cloud-based network services, or any other resource that may be used by the computer 700.

The processor 702 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 704. Memory 704 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 702 may operate under the control of an operating system 714 that resides in memory 704. The operating system 714 may manage computer resources so that computer program code embodied as one or more computer software applications, such as an application 716 residing in memory 704, may have instructions executed by the processor 702. In an alternative embodiment, the processor 702 may execute the application 716 directly, in which case the operating system 714 may be omitted. One or more data structures 718 may also reside in memory 704, and may be used by the processor 702, operating system 714, or application 716 to store or manipulate data.

The I/O interface 706 may provide a machine interface that operatively couples the processor 702 to other devices and systems, such as the external resource 710 or the network 712. The application 716 may thereby work cooperatively with the external resource 710 or network 712 by communicating via the I/O interface 706 to provide the various features, functions, applications, processes, or modules comprising embodiments of the invention. The application 716 may also have program code that is executed by one or more external resources 710, or otherwise rely on functions or signals provided by other system or network components external to the computer 700. Indeed, given the nearly endless hardware and software configurations possible, it should be understood that embodiments of the invention may include applications that are located externally to the computer 700, distributed among multiple computers or other external resources 710, or provided by computing resources (hardware and software) that are provided as a service over the network 712, such as a cloud computing service.

The HMI 708 may be operatively coupled to the processor 702 of computer 700 to allow a user to interact directly with the computer 700. The HMI 708 may include video or alphanumeric displays, a touch screen, a speaker, and any other suitable audio and visual indicators capable of providing data to the user. The HMI 708 may also include input devices and controls such as an alphanumeric keyboard, a pointing device, keypads, pushbuttons, control knobs, microphones, etc., capable of accepting commands or input from the user and transmitting the entered input to the processor 702.

A database 720 may reside in memory 704, and may be used to collect and organize data used by the various systems and modules described herein. The database 720 may include data and supporting data structures that store and organize the data. In particular, the database 720 may be arranged with any database organization or structure including, but not limited to, a relational database, a hierarchical database, a network database, or combinations thereof. A database management system in the form of a computer software application executing as instructions on the processor 702 may be used to access the information or data stored in records of the database 720 in response to a query, which may be dynamically determined and executed by the operating system 714, other applications 716, or one or more modules.

The invention claimed is:

1. A system for monitoring fluid dispensers, comprising:
at least one fluid dispenser for dispensing chemicals, comprising:
at least one sensor configured to sense fluid flow;
a dispenser management unit comprising:
at least one input for receiving sensor data from the or each sensor;
a processor, and a corresponding storage memory configured to store firmware, wherein the processor is configured to, in dependence on said received sensor data, determine at least a number of incorrect operations per day;
a wireless data transfer device comprising a wireless data transfer device storage memory configured to store said received sensor data, wherein the wireless data transfer device storage memory is configured to store at least the number of incorrect operations per day; and
a power source, independent of mains power, for powering at least said processor, wherein the processor is configured to compare the number of incorrect operations per day to a threshold value, and output to said wireless data transfer device storage memory a maintenance mode indication upon said number of incorrect operations per day being greater than said threshold;
at least one portable terminal comprising a wireless device reader configured to receive the data stored on said wireless data transfer device, and a terminal communications module; and
a remote server comprising a server communications module, wherein said remote server is configured to communicate with said terminal via a communications link between said terminal communications module and said server communications module,
wherein, said terminal further comprises a terminal storage memory configured to store sensor data received from the or each wireless data transfer device, the terminal being configured to upload said received sensor data upon communicating with said remote server.

2. The system according to claim 1, wherein said wireless data transfer device storage memory, of said fluid dispenser, is configured to store a unique identifier number.

3. The system according to claim 1, wherein said corresponding storage memory configured to store firmware, of said fluid dispenser, is configured to store a fluid dispenser type identifier.

4. The fluid dispenser according to claim 1, said processor of said fluid dispenser being configured to, in dependence on said received data, compare the total number of operations to a threshold value, and output to said wireless data transfer device storage memory a maintenance mode indication upon said total number of operations being greater than said threshold.

5. The system according to claim 1, further comprising a data transfer device mountable to equipment to be monitored, wherein the data transfer device comprises a data transfer device storage memory configured to store a unique identifier number.

6. The system according to claim 1, wherein, upon a first pairing of said portable terminal device reader and said data transfer device, said portable terminal is configured to receive at least one input from a user to associate said data transfer device with at least one of: a physical location; a chemical to be dispensed by said fluid dispenser; and a chemical dispenser tip type.

7. The system according to claim 1, wherein said remote server is further configured as a web server configured to enable said received sensor data to be accessed from remote terminals having a web-browser.

8. The system according to claim 7, wherein said web server requires authorized log-in details to access said received sensor data.

9. The system according to claim 1, wherein the terminal communications module is configured to use a wireless communications protocol.

10. The system according to claim 1, wherein said portable terminal is one of: a smartphone; a mobile telephone; a Personal Digital Assistant (PDA); and a tablet computer.

11. The system according to claim 1, wherein said wireless data transfer device is one of: an NFC device, an RFID device, and a Bluetooth device.

12. A method of monitoring fluid dispensers including a power source, independent of mains power, for powering a processor of the fluid dispensers, comprising:
on a wireless data transfer device mounted to a fluid dispenser:
receiving sensor data from at least one sensor on said fluid dispenser;
storing said sensor data;
on the fluid dispenser:
in dependence on said received sensor data, determining and storing at least one parameter, including: a number of incorrect operations per day; and
comparing the number of incorrect operations per day to a threshold value, and storing on said wireless data transfer device a maintenance mode indication upon said number of incorrect operations per day being greater than said threshold;
on a portable terminal having a wireless device reader and a communications module:
initiating a communications link between said wireless device reader and said wireless data transfer device;
receiving the data stored on said wireless data transfer device;
initiating a communications link between a remote server and said communications module; and
uploading said received data to said remote server.

13. The method according to claim 12, further comprising:
on the remote server having a server communications module:
storing said uploaded received data; and
downloading said received data to a remote terminal upon said terminal accessing a web server running on said remote server.

14. The method according to claim 12, further comprising:
on said fluid dispenser:
wherein determining and storing a plurality of parameters in dependence on said received sensors data further includes determining and storing the total number of operations, and
comparing the total number of operations to a threshold value, and storing on said wireless data transfer device a maintenance mode indication upon said total number of operations being greater than said threshold.

15. The method according to claim 12, further comprising the step of determining the volume of chemical dispensed in each operation in dependence on said received sensor data.

16. The method according to claim 12, further comprising the step of indicating to a user upon at least one of: a correct fluid dispenser operation; an incorrect dispenser operation; and the fluid dispenser requiring maintenance.

17. The method according to claim 12, further comprising the step of, upon a first pairing of said portable terminal device reader and said data transfer device, receiving at least one input from a user to associate said data transfer device with at least one of:
  a physical location; a chemical to be dispensed by said fluid dispenser; and a chemical dispenser tip type.

18. The method according to claim 12, wherein said wireless data transfer device is one of: an NFC device, an RFID device, and a Bluetooth device.

* * * * *